Feb. 18, 1969     K. D. WRIGHT     3,428,863
CAPACITIVE WELDING CIRCUIT
Filed Nov. 18, 1965
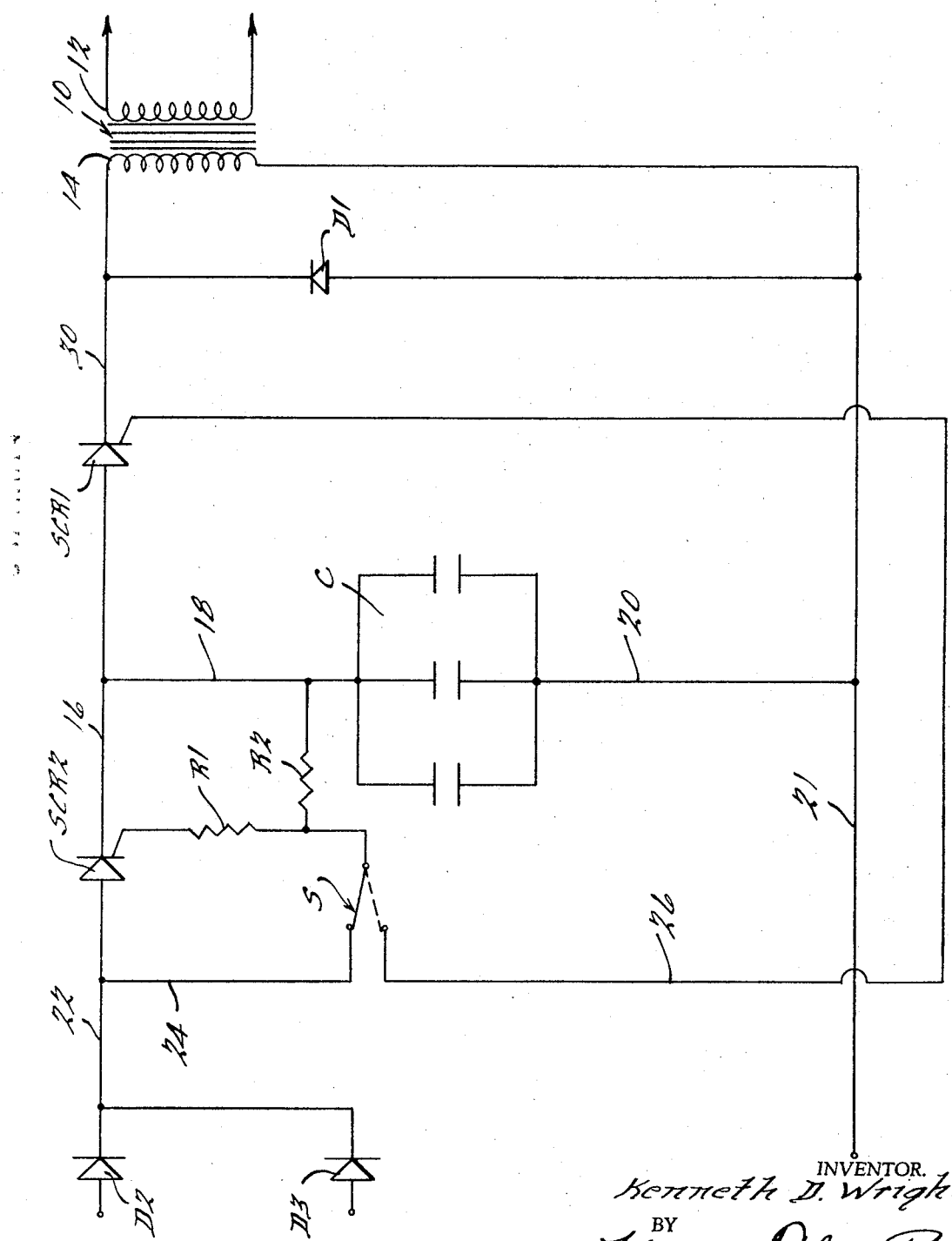
INVENTOR.
Kenneth D. Wright
BY
Carness, Dickey & Pierce
ATTORNEYS.

3,428,863
CAPACITIVE WELDING CIRCUIT
Kenneth D. Wright, Pontiac, Mich., assignor, by mesne assignments, to Ebbert Engineering Company, Troy, Mich., a corporation of Michigan
Filed Nov. 18, 1965, Ser. No. 508,455
U.S. Cl. 315—241                11 Claims
Int. Cl. H05b 41/14

ABSTRACT OF THE DISCLOSURE

A welding circuit utilizing a capacitive discharge for providing pulses of welding current, as well as trigger pulses for solid state control apparatus, and including a switch mechanically operable to one position to charge the capacitor and to a second condition for discharging the capacitor into the welding circuit.

---

The present invention relates to welding circuits and more particularly to a welding circuit having a solid state control for capacitive discharge apparatus.

It is a common practice in welding circuits to control the welding current by having it flow through the contacts of a relay. In the present invention a circuit is provided in which the heavy welding current is passed through a solid state controlled conduction device; with the transmission of welding current through moving contacts eliminated, a circuit requiring less maintenance is provided. Therefore, it is an object of the present invention to provide a novel welding circuit in which the heavy welding current is controlled by being passed through a solid state controlled conduction device.

It is another object of the present invention to provide a capactive discharge type welding circuit in which the heavy welding current is controlled by passing it through a solid state controlled conduction device rather than through movable contacts.

Another object of the present invention is to provide a novel welding circuit.

Other objects, features and advantages of the present invention will become apparent from the subsequent description and the appended claims, taken in conjunction with the accompanying drawing, in which:

The drawing is an electrical schematic diagram of a preferred form of the present invention.

Looking now to the drawing, a welding transformer is generally indicated by the numeral 10 and has a secondary winding 12 which is adapted to be connected to a pair of welding electrodes and which is energized by means of current passing through the primary 14. The primary winding 14 is shunted by a diode D1 which provides a short circuit path for the current generated by the collapsing field of the transformer 10 which occurs after a pulse of welding current has passed through the transformer 10. The welding current is transmitted to the transformer 10 by means of the principal electrodes of a controlled rectifier SCR1, with the current being provided by a plurality of capacitors C; the capacitors C are charged by means of a controlled rectifier SCR2 which has its cathode connected to a common connection of the parallelly connected capacitors C by means of conductors 16 and 18, with the opposite side of the parallelly connected capacitors C being connected to a ground conductor 21 via conductor 20. The anode of the SCR2 is connected to a source of alternating potential by means of a pair of parallelly connected diodes D2 and D3 and a conductor 22. The A-C source then has one end connected to the anodes of diodes D2 and D3 and has its other end connected to ground conductor 21.

With the circuit as shown only the positive pulses of the A-C source will be transmitted through diodes D2 and D3. The controlled rectifier SCR2 has its gate electrode connected to a single pole, double throw switch S by means of a bias resistor R1 which is connected to the movable arm of the switch S. With the arm of switch S engaged in its upper position, as shown in the drawing, it connects resistor R1 to the conductor 22 via a conductor 24. Thus, in the position as shown, the SCR2 will be biased into conduction by the positive input pulses through the diodes D2 and D3 and hence SCR2 will transmit these positive pulses as charge current to the capacitors C. Note that with the welding circuit in a standby condition between welds, the charge in the capacitors C will be maintained by means of the current which can continuously flow through the SCR2. A second bias resistor R2 is connected to the conductor 18 and thence to the movable arm of the switch S and, with the switch S in its lowermost position as shown by the dotted line, the resistor R2 will be connected to the gate electrode of the SCR1 via a conductor 26. The anode of the SCR1 is connected to the conductor 18 by means of conductor 16 and its cathode is connected to the high potential side of the primary winding 14 via a conductor 30. Thus, when the SCR1 is rendered conductive, the charge stored up in the bank of capacitors C can then discharge through the primary winding 14 via the conductor 18, the conductor 16, the principal electrodes of the SCR1 and the conductor 30. Note, however, that with the switch S in the position as shown in the drawing the gate electrode SCR1 is open circuited and hence the SCR1 once it has ceased conduction is maintained in a nonconductive condition and cannot transmit welding current to transformer 10. When the switch S is moved to its alternate position, as shown by the dotted line in the drawing, the resistor R2 is connected to the gate electrode whereby some of the charge current stored in the bank of capacitors C and flow through the gate cathode circuit of the SCR1 to thereby bias the SCR1 to a conductive condition whereby the electrical energy stored in the bank of capacitors C can then discharge through the principal electrodes of the SCR1 and through the primary 14 to provide the welding current in the secondary 12. Note that at this time, with the switch S in its alternate position, the SCR2 once it has ceased conduction bank of capacitors C can flow through the gate cathode circuit will then be opened. With SCR2 nonconductive current from the source to the diodes D2, D3, will be blocked from transmission through the SCR2 and the SCR1 to the primary to the welding transformer 10. After occurrence of the pulse of welding current, the switch S can then be placed in its original position as shown in the drawing whereby charging of the bank of capacitors C will again occur and the circuit will be ready for the next welding operation. Note that in the circuitry as shown, the contacts of the switch S are utilized to pass only currents of small magnitude, being the gating currents for the controlled rectifiers SCR1 and SCR2. The heavy welding current, however, is passed through the principal electrodes of SCR1 which are electrically switched from a nonconductive to a conductive state. The elimination of mechanical switching and elimination of contacts in the transmission of the heavy welding current provides a circuit having a long life and requiring minimum maintenance.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A welding circuit operable from a source of electrical energy comprising: energy storage means for storing electrical energy, weld circuit means for providing an output pulse of welding current responsively to an input pulse of electrical energy, charge circuit means electrically connected to said energy storage means and having a charge condition for providing electrical energy to said energy storage means, discharge circuit means electrically connected to said energy storage means and having a discharge condition for connecting said energy storage means to said weld circuit means whereby the electrical energy stored in said energy storage means is transmitted as an input pulse to said weld circuit means, said discharge circuit means comprising a controlled conduction device having a pair of principal electrodes and control electrode means for controlling the conduction of said principal electrodes and circuit means electrically connecting said principal electrodes and said energy storage means and said weld circuit means whereby the input pulse to said weld circuit means is transmitted through said principal electrodes, and switch means selectively operable to first and second conditions and electrically connected to said charge and discharge circuit means for placing said charge circuit means in said charge condition when said switch means is in said first condition and for placing said discharge circuit means in said discharge condition when said switch means is in said second condition, said switch means being actuable to said first and second conditions by a single mechanically actuable device.

2. The circuit of claim 1 with said charge circuit means comprising a second controlled conduction device having a pair of second principal electrodes and second control electrode means for controlling the conduction of said second principal electrodes, and circuit means electrically connecting said second principal electrodes and said energy storage means whereby the electrical energy is transmitted to said energy storage means through said second principal electrodes.

3. The circuit of claim 1 with said charge circuit means having a noncharge condition for blocking the transmission of electrical energy to said energy storage means and with said switch means changing the condition of said charge circuit means from said charge condition to said non-charge condition when said switch means is in said second condition.

4. The circuit of claim 3 with said discharge circuit means having a blocking condition for blocking the transmission of electrical energy to said weld circuit means and with said switch means changing the condition of said discharge circuit means from said discharge condition to said blocking condition when said switch means is in said first condition.

5. The circuit of claim 1 with said discharge circuit means having a blocking condition for blocking the transmission of electrical energy to said weld circuit means and with said switch means changing the condition of said discharge circuit means from said discharge condition to said blocking condition when said switch means is in said first condition.

6. A welding circuit operable from a source of electrical energy comprising: energy storage means for storing electrical energy, weld circuit means for providing an output pulse of welding current responsively to an input pulse of electrical energy, charge circuit means electrically connected to said energy storage means and having a charge condition for providing electrical energy to said energy storage means, discharge circuit means electrically connected to said energy storage means and having a discharge condition for connecting said energy storage means to said weld circuit means whereby the electrical energy stored in said energy storage means is transmitted as an input pulse to said weld circuit means, and switch means selectively operable to first and second conditions and electrically connected to said charge and discharge circuit means for placing said charge circuit means in said charge condition when said switch means is in said first condition and for placing said discharge circuit means in said discharge condition when said switch means is in said second condition, said discharge circuit means comprising a controlled conduction device having a pair of principal electrodes and control electrode means for controlling the conduction of said principal electrodes and circuit means electrically connecting said principal electrodes and said energy storage means and said weld circuit means whereby the input pulse to said weld circuit means is transmitted through said principal electrodes, said switch means comprising circuit means for electrically connecting said control electrode means to said energy storage means and for transmitting electrical energy from said energy storage means to said control electrode means with said switch means in said second condition whereby said principal electrodes are rendered conductive for transmitting the stored energy from said energy storage means to said weld circuit means.

7. A welding circuit operable from a source of electrical energy comprising: energy storage means for storing electrical energy, weld circuit means for providing an output pulse of welding current responsively to an input pulse of electrical energy, charge circuit means electrically connected to said energy storage means and having a charge condition for providing electrical energy to said energy storage means, discharge circuit means electrically connected to said energy storage means and having a discharge condition for connecting said energy storage means to said weld circuit means whereby the electrical energy stored in said energy storage means is transmitted as an input pulse to said weld circuit means, and switch means selectively operable to first and second conditions and electrically connected to said charge and discharge circuit means for placing said charge circuit means in said charge condition when said switch means is in said first condition and for placing said discharge circuit means in said discharge condition when said switch means is in said second condition, said energy storage means comprising a capacitor, said charge circuit means comprising a first controlled conduction device having a pair of first principal electrodes and a first control electrode for rendering said first principal electrodes conductive, and hence placing said charge circuit means in said charge condition, responsively to a trigger signal, said discharge circuit means comprising a second controlled conduction device having a pair of second principal electrodes and a second control electrode for rendering said second principal electrode conductive, and hence placing said discharge circuit means in said discharge condition, responsively to a trigger pulse, and said switch means comprising a manually actuable switch movable to said first and second conditions and circuit means electrically connecting said first control electrode to the source with said switch in said first condition for transmitting a trigger pulse from the source to said first control electrode and electrically connecting said second control electrode to said capacitor with said switch in said second condition for transmitting a trigger pulse from said capacitor to said second control electrode.

8. The circuit of claim 7 with said circuit means electrically disconnecting said first control electrode from the source with said switch in said second condition and for electrically disconnecting said second control electrode from said capacitor with said switch in said first condition.

9. The circuit of claim 8 with said switch including a movable arm, and a pair of fixed contacts, said circuit means including a first circuit means electrically connecting one of said first and second control electrodes to said movable arm and a second circuit means electrically connecting the other of said first and second control electrodes to one of said fixed contacts.

10. The circuit of claim 9 in which said one of said control electrodes is said first control electrode and with said first circuit means including a first biasing resistor and with third circuit means including a second biasing resistor connecting said capacitor to said movable arm.

11. The circuit of claim 10 in which said first and second controlled conduction devices are of the controlled rectifier type.

References Cited
UNITED STATES PATENTS

| | | | |
|---|---|---|---|
| 2,235,385 | 3/1941 | Rava | 315—241 XR |
| 2,697,784 | 12/1954 | Blythe | 328—67 |
| 2,876,386 | 3/1959 | Fefer et al. | 315—227.1 |
| 3,171,011 | 2/1965 | English | 219—98 |
| 3,305,755 | 2/1967 | Walsh | 307—88.5 XR |

JOHN S. HEYMAN, *Primary Examiner.*

JOHN ZAZWORSKY, *Assistant Examiner.*

U.S. Cl. X.R.

307—246, 252, 268; 315—209; 328—67

UNITED STATES PATENT OFFICE
CERTIFICATE OF CORRECTION

Patent No. 3,428,863  February 18, 1969

Kenneth D. Wright

It is certified that error appears in the above identified patent and that said Letters Patent are hereby corrected as shown below:

Column 2, line 38, "and" should read -- can --; line 46, "ba of capacitor C can flow through the" should read -- will be maintained nonconductive since its --.

Signed and sealed this 24th day of March 1970.

(SEAL)
Attest:

Edward M. Fletcher, Jr.
Attesting Officer

WILLIAM E. SCHUYLER, JR.
Commissioner of Patents